United States Patent Office 3,118,875
Patented Jan. 21, 1964

3,118,875
GLUCOSAMINE ACETYLSALICYLATE AND
PROCESS FOR PREPARING SAME
Ernest C. Adams, Jr., Elkhart, Ind., assignor to Miles
Laboratories, Inc., Elkhart, Ind., a corporation of
Indiana
No Drawing. Filed Mar. 2, 1959, Ser. No. 796,200
2 Claims. (Cl. 260—211)

This invention relates to new chemical compositions and to processes for their preparation. Particularly, the invention relates to new chemical compositions which have utility as pharmaceuticals for use singly or in combination with other medicants. More particularly, the invention relates to a new and novel series of chemical compositions which are salts of hexosamines and acetylsalicylic acid.

The new compositions of this invention possess several chemical and pharmaceutical properties which make them unique. Physically, the new compositions of matter represent soluble derivatives of acetylsalicylic acid which can readily be absorbed from the gastro-intestinal tract. These new compositions are neutral, stable derivatives of acetylsalicylic acid which do not possess the high acidity of this compound. The compositions of this invention are salts which do not have irritating effects upon the stomach. They are readily emptied from the stomach when administered orally and have enhanced intestinal absorption when compared to other derivatives of acetylsalicylic acid. This is believed to be due to the fact that glucosamine salt is soluble. Glucosamine itself is non-toxic even in relatively large doses. For example, the $LD_{50}$ rat, oral, was not reached up to 8 grams/kg.

Further advantages of the compounds of this invention reside in the fact that they can be given in large doses without resulting in any accumulation of alkali or the distortion of any electrolyte equilibrium of the body.

Briefly stated, the compounds of the present invention represent reaction products of hexosamines such as glucosamine, galactosamine, mannosamine, etc., which may be represented by the formula:

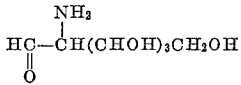

with acetylsalicylic acid. Using as example, glucosamine, the equations for the formation of the compositions of this invention are as follows:

EXHIBIT A

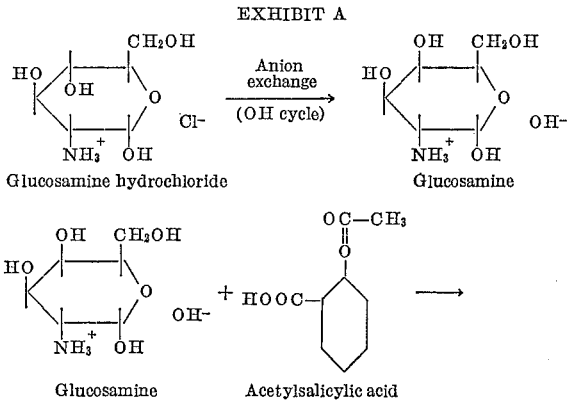

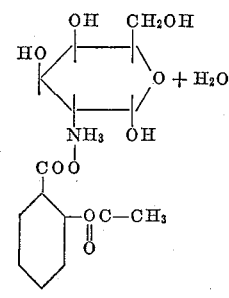

Glucosamine acetylsalicylate

The compound produced by the process of this invention may be alternatively illustrated by the following symbolic representation:

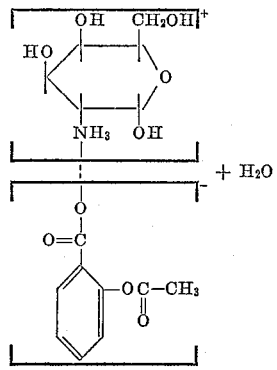

This representation is analogous to that used for the identification of sodium chloride in a similar aqueous composition, i.e.: $[Na]^+[Cl]^-$.

*Example*

Glucosamine hydrochloride is dissolved in water to prepare a 25% solution. This solution is passed through a column of an ion exchange resin (Amberlite XE58) in the hydroxyl cycle.

In a separate container 10 gms. of acetylsalicylic acid is suspended in 15 ml. of water. The effluent from the ion exchange column is gradually added to this water suspension until the acetylsalicylic acid dissolves. The pH of the resulting solution is about 5.0.

Solid glucosamine acetylsalicylate may be prepared from this solution as follows:

A. The solution is lyophilized to yield a slightly yellow powder.

B. Excess acetylsalicylic acid is added to the solution until there is some undissolved acetylsalicylic acid present. To this solution containing solid actylsalicylic acid 10 to 12 volumes of acetone is added and the total mixture chilled. Glucosamine acetylsalicylate precipitates as a yellow gum which may be removed by filtration or centrifugation. The yellow gum may be further purified to a yellow amorphous solid by washing with additional acetone.

This solid may be further purified by dissolution in a small amount of water, treating with activated carbon and then lyophilizing or reprecipitating with chilled acetone.

Although the example given above is limited to glucosamine, it is to be understood that any of the hexosamine may be used. Equimolar amounts of the hexosamine and the acid usually in the form of a water slurry are used. The reaction proceeds to completion smoothly. It has been found advantageous to add the solution of the hexosamine to the acid slurry over a period of time of from ½ to 1 hour in order to insure that the pH of the reactants never exceeds about 5.0.

The recovery of the desired salt may be accomplished by lyophilization of the reaction mixture or by adding an excess of an organic solvent such as acetone with subsequent chilling to precipitate the salt. After filtration the precipitate may be taken up with a small amount of water and further purified by lyophilization or reprecipitation.

It is also to be understood that other acids such as other substituted salicylic acids may be used in place of acetylsalicylic acid. For example hexosamine salts of p-aminosalicylic acid may be prepared in accordance with the inventive concept.

To review briefly, this invention relates to new compositions of matter which comprise the hexosamine salts of acetylsalicylic acid and to a process for their preparation. Of particular importance is the glucosamine salt of acetylsalicylic acid. The process comprises the steps of reacting together the hexosamine with an equimolar amount of the acid in the form of a water slurry and separating and recovering the desired salt.

What is claimed is:

1. As a new pharmacological composition of matter glucosamine acetylsalicylate.

2. A process for the preparation of a hexosamine salt of acetylsalicylic acid which comprises converting glucosamine hydrochloride in an ion exchange column to the free base and adding said free base immediately as it is formed to a slurry of acetylsalicylic acid until such time as the reaction is complete, and lyophilizing the resulting mixture to recover the desired product therefrom.

References Cited in the file of this patent

UNITED STATES PATENTS

| | | |
|---|---|---|
| 778,556 | Summers et al. | Dec. 27, 1904 |
| 1,994,467 | Flint et al | Mar. 19, 1935 |
| 2,052,663 | Rothberg et al. | Sept. 1, 1936 |
| 2,132,662 | Volweiler et al. | Oct. 11, 1938 |
| 2,233,419 | Moore | Mar. 4, 1941 |
| 2,903,444 | Schraufstatter et al. | Sept. 8, 1959 |
| 2,918,462 | Druey et al. | Dec. 22, 1959 |

FOREIGN PATENTS

| | | |
|---|---|---|
| 713,471 | Germany | Oct. 16, 1941 |

UNITED STATES PATENT OFFICE
CERTIFICATE OF CORRECTION

Patent No. 3,118,875              January 21, 1964

Ernest C. Adams, Jr.

It is hereby certified that error appears in the above numbered patent requiring correction and that the said Letters Patent should read as corrected below.

Column 1, line 32, for "rat," read -- Rat, --; column 1, lines 51 to 65 and column 2, lines 1 to 13, strike out the formulas in their entirety and insert instead the following:

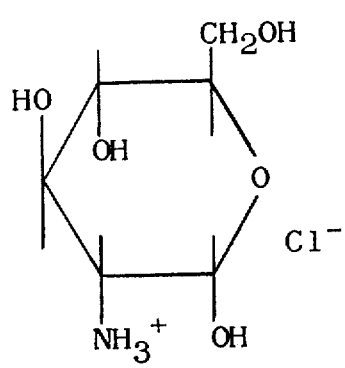

Glucosamine hydrochloride

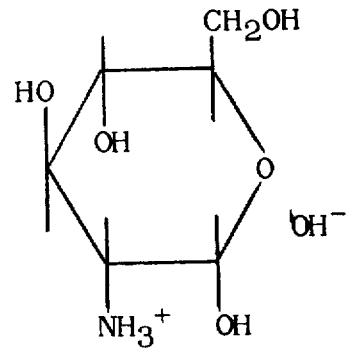

Glucosamine

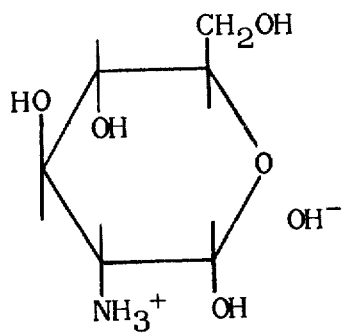

Glucosamine

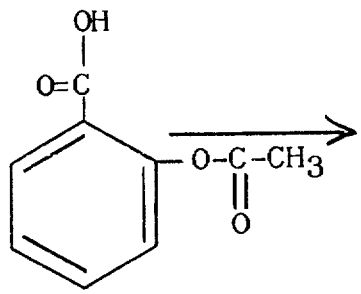

Acetylsalicylic acid

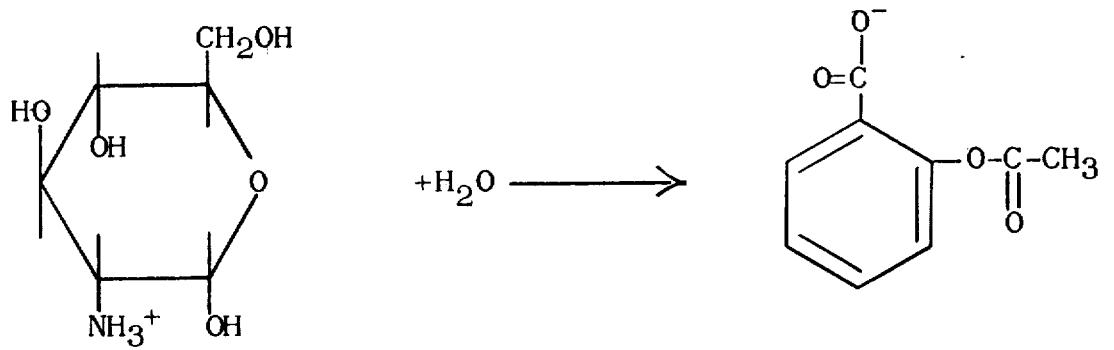

Glucosamine acetylsalicylate column 2, lines 17 to 32, strike out the formulas in their entirety and insert instead the following:

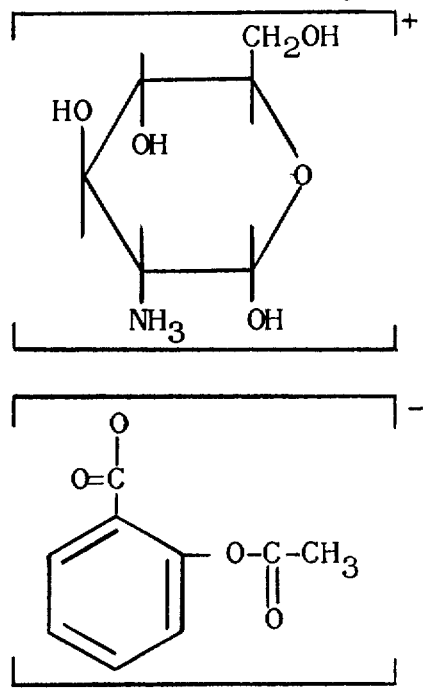

same column 2, line 53, for "actylsalicylic" read -- acetylsalicylic --; lines 63 and 64, for "hexosamine" read -- hexosamines --.

Signed and sealed this 14th day of July 1964.

(SEAL)
Attest:

ESTON G. JOHNSON
Attesting Officer

EDWARD J. BRENNER
Commissioner of Patents